(12) United States Patent
Skog (10) Patent No.: US 10,045,175 B2
(45) Date of Patent: Aug. 7, 2018

(54) HANDLING DEVICE GENERATED DATA

(75) Inventor: Robert Skog, Hasselby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 168 days.

(21) Appl. No.: 14/232,810

(22) PCT Filed: Jul. 14, 2011

(86) PCT No.: PCT/EP2011/062100
§ 371 (c)(1),
(2), (4) Date: Jan. 14, 2014

(87) PCT Pub. No.: WO2013/007314
PCT Pub. Date: Jan. 17, 2013

(65) Prior Publication Data
US 2014/0143383 A1 May 22, 2014

(51) Int. Cl.
| | | |
|---|---|---|
| *G06F 15/16* | (2006.01) |
| *H04W 4/70* | (2018.01) |
| *H04W 4/50* | (2018.01) |
| *H04W 4/00* | (2018.01) |
| *H04L 29/08* | (2006.01) |

(52) U.S. Cl.
CPC .............. *H04W 4/70* (2018.02); *H04L 67/02* (2013.01); *H04W 4/001* (2013.01); *H04W 4/005* (2013.01); *H04W 4/50* (2018.02)

(58) Field of Classification Search
None
See application file for complete search history.

(56) References Cited

U.S. PATENT DOCUMENTS

| 7,085,814 B1* | 8/2006 | Gandhi | H04L 29/1232 |
| | | | 709/208 |
| 7,123,626 B1* | 10/2006 | Feyerabend | H04L 29/06 |
| | | | 370/328 |
| 7,130,773 B1 | 10/2006 | Wong | |
| 9,135,031 B1* | 9/2015 | Knight | G06F 9/455 |
| 9,226,179 B2 | 12/2015 | Chen | |
| 2003/0005177 A1* | 1/2003 | Duran | G06F 9/4411 |
| | | | 719/327 |

(Continued)

FOREIGN PATENT DOCUMENTS

| CN | 1906642 A | 1/2007 |
| CN | 101084662 A | 12/2007 |

(Continued)

OTHER PUBLICATIONS

Search Report dated Feb. 2, 2016, issued in Chinese Patent Application No. 201180072315.1, 3 pages.

(Continued)

*Primary Examiner* — Phyllis A Book
(74) *Attorney, Agent, or Firm* — Rothwell, Figg, Ernst & Manbeck, P.C.

(57) ABSTRACT

There is provided a method of caching device generated data. The method comprises receiving device generated data from a device via a wireless communication network. The method further comprises retrieving a device identifier used by components within the wireless communication network to identify the device; and storing the device generated data with the device identifier.

12 Claims, 4 Drawing Sheets

(56) References Cited

U.S. PATENT DOCUMENTS

| | | | |
|---|---|---|---|
| 2004/0133453 A1* | 7/2004 | Jomini | A61B 5/1117 705/2 |
| 2005/0088299 A1 | 4/2005 | Bandy et al. | |
| 2008/0117893 A1* | 5/2008 | Witzel | H04W 80/10 370/352 |
| 2008/0310425 A1* | 12/2008 | Nath | H04L 29/12028 370/395.54 |
| 2009/0217348 A1* | 8/2009 | Salmela | H04L 63/08 726/2 |
| 2009/0253409 A1* | 10/2009 | Slavov | H04L 63/0823 455/411 |
| 2010/0100876 A1* | 4/2010 | Glover | H04W 4/00 717/178 |
| 2010/0122334 A1* | 5/2010 | Stanzione | G06Q 10/0637 726/11 |
| 2011/0164511 A1* | 7/2011 | Poon | H04L 43/0811 370/252 |
| 2011/0213871 A1* | 9/2011 | DiGirolamo | H04W 4/00 709/223 |
| 2012/0198268 A1* | 8/2012 | Qureshi | G06F 11/1443 714/4.1 |
| 2012/0246305 A1* | 9/2012 | Vedula | H04L 41/0813 709/224 |
| 2013/0151170 A1* | 6/2013 | Uchida | G06Q 10/06 702/33 |
| 2013/0329653 A1* | 12/2013 | Russell, Jr. | H04W 4/005 370/329 |
| 2014/0032634 A1* | 1/2014 | Pimmel | H04L 65/4076 709/203 |
| 2014/0128050 A1* | 5/2014 | Bas Sanchez | H04L 65/1069 455/418 |
| 2014/0149534 A1 | 5/2014 | Skog | |

FOREIGN PATENT DOCUMENTS

| | | | | |
|---|---|---|---|---|
| CN | 101222419 A | 7/2008 | | |
| DE | 198 44 631 A1 | 4/2000 | | |
| EP | 1 607 723 A1 | 12/2005 | | |
| EP | 1607723 A1 * | 12/2005 | | G01D 9/005 |
| WO | 2009071735 A1 | 6/2009 | | |
| WO | WO 2009071735 A1 * | 6/2009 | | H04W 12/12 |
| WO | WO2009071735 A1 * | 6/2009 | | G06F 21/00 |

OTHER PUBLICATIONS

Chinese Office Action dated May 16, 2016, issued in Chinese Patent Application No. 201180072315.1, 20 pages.

3rd Chinese Office Action dated Nov. 2, 2016, issued in Chinese Patent Application No. 201180072315.1, 19 pages.

* cited by examiner

HANDLING DEVICE GENERATED DATA

CROSS REFERENCE TO RELATED APPLICATION(S)

This application is a 35 U.S.C. § 371 National Phase Entry Application from PCT/EP2011/062100, filed Jul. 14, 2011, designating the United States, the disclosure of which is incorporated herein in its entirety by reference.

TECHNICAL FIELD

The present application relates to a method of caching device generated data, a server arranged to cache device generated data, and a computer-readable medium.

BACKGROUND

Machine-to-machine (M2M) broadly refers to technologies which allow devices to communicate with other devices via wired and wireless networks. M2M devices will, in many cases, produce data that an M2M application may access, interpret and act upon. For example: an M2M device may send information representing a temperature reading of 47° C. An M2M application may receive this information, interpret it and then initiate some action.

Depending on the nature of the data and the nature of the corresponding action, the data exchange between a device and an application can occur synchronously or asynchronously. This is particularly likely where the communications network connecting to the M2M device is wireless. Synchronous data exchange requires a real-time connection, but in many cases the M2M device will produce data that can be consumed by the application at a later point in time. For example, the data supplied by an electricity meter to a billing application can be supplied at substantially any time, the primary requirement being that the information is accurate. This means that certain communications can be postponed until off-peak hours, which may help smooth peaks in network traffic. However, a contrary example is that of data transmitted from a vehicle to an emergency services application in the event of an accident. Here it is important that the information is transmitted as soon as possible. In either case, due to variations in traffic over a wireless communications network and variations in the radio conditions, it is to be expected that at some times communication with an M2M device will not be possible.

SUMMARY

A mechanism for asynchronous M2M communication is provided. This allows for a request received from an M2M application, the request for data from an M2M device, to still be serviced in the absence of a viable communication link between the network and the M2M device. To facilitate this, the wireless communications network is provided with a mechanism for interim data storage. This allows a request for data from an M2M application to be answered using the stored data, which includes the data most recently received from the M2M device. This allows requests for data to be serviced in the absence of a viable communication link between the network and the M2M device. Further, even if there is a viable communication link between the network and the M2M device, the request may be more quickly serviced from storage than by communicating directly with the device.

However, providing an interim data storage function is not straightforward. Such a function must be able to distinguish between the different M2M devices for which data is stored. Further, this data needs to be readily retrievable when a request from an M2M application is received, and the data must be uniquely attributable to a particular M2M device. These requirements could be met by provisioning a unique identity to each device for which data is stored, but doing so would be a complex procedure, particularly given the ability of the devices to move from one geographical location to another.

It has been noted that each device in the wireless communications network has a unique identity used by the network to distinguish between different devices. This unique identity comprises at least one of the IMEI (International Mobile Equipment Identity), the IMSI (International Mobile Subscriber Identity), and the MSISDN (Mobile Subscriber Integrated Services Digital Network Number).

According to the methods and apparatus disclosed herein, the M2M data is stored using a unique identifier for the M2M device, the unique identifier being the same as that used in the wireless communications network as a primary key. In this way, each M2M data record stored is uniquely associated with the correct M2M device. Later, the data from a particular device can be readily retrieved because the stored data can be reliably associated with the particular device. Further, such retrieval can be done without the need to map the request to a new additional device identifier.

There is provided a method of caching device generated data. The method comprises receiving device generated data from a device via a wireless communication network. The method also comprises retrieving a device identifier used by components within the wireless communication network to identify the device. The method further comprises storing the device generated data with the retrieved device identifier.

Because the same device identifier that is used by the wireless communications network is used to label the stored device generated data, the stored data is uniquely attributable to the device that generated it, without the need for provisioning a new unique identification number to each device. The method may further comprise storing the device generated data using the retrieved device identifier as a primary key.

Where the device generated data is stored in a file system, the root directory of the file system may be named with the device identifier. The device may be a sensor, and may include a wireless communication module.

The method may further comprise receiving a request for particular device generated data. The method may further still comprise, in response to such a request, retrieving the particular device generated data; and returning the particular device generated data in reply to the request. The request may identify the particular device by its device identifier.

The device generated data can be readily retrieved from storage, particularly if the request for device generated data includes the device identifier in the retrieve message. If the request does not include the device identifier, then the method may further comprise mapping the device identified in the request to a device identifier. The device identifier may comprise at least one of the MSISDN, IMSI, and IMEI.

There is further provided a server arranged to cache device generated data. The server comprises a receiver, a processor, and a memory. The receiver is arranged to receive device generated data from a device via a wireless network. The processor is arranged to retrieve a device identifier used by components within the wireless network to identify the device. The memory is arranged to store the device generated data with the device identifier.

The server may further comprise a session database for receiving session information in respect of the device. The session information may comprise an IP-address of the device, plus the device identifier. The session information may be required to discover the device identifier used by the wireless communications network if the device does not include the appropriate device identifier with the device generated information to be stored.

The memory may store the device generated data in a file system, wherein the root directory of the file system is named with the device identifier.

The receiver may be further arranged to receive a request for particular device generated data. The processor may be further arranged to retrieving the particular device generated data, and return the particular device generated data in reply to the request.

There is further provided a computer-readable medium, carrying instructions, which, when executed by computer logic, causes said computer logic to carry out any of the methods defined herein.

BRIEF DESCRIPTION OF THE DRAWINGS

A method and apparatus for handling device generated data will now be described, by way of example only, with reference to the accompanying drawings, in which.

DETAILED DESCRIPTION

In order to at least partially address some of the problems associated with caching device generated data, as describe above, according to the methods and apparatus disclosed herein the M2M data is stored using, as a primary key, the same unique identifier for the M2M device that is used in the wireless communications network.

Figure 1:
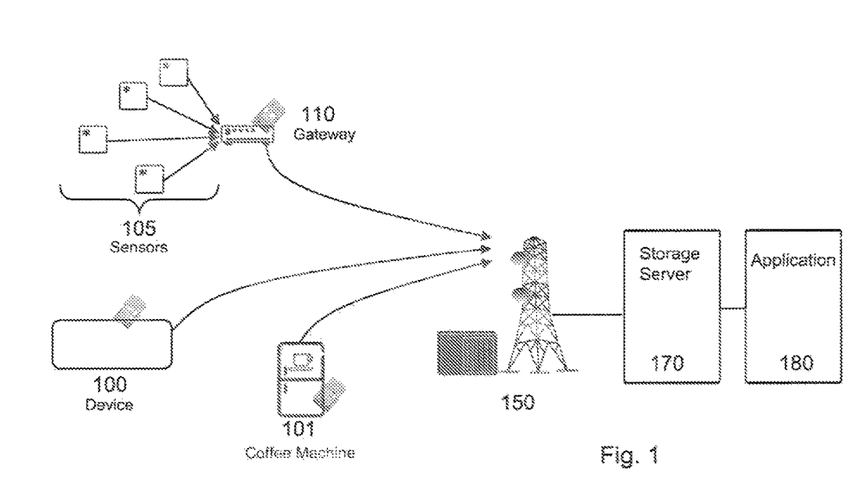
FIG. 1 illustrates the basic arrangement of a system incorporating the method disclosed herein.

FIG. 1 illustrates the basic arrangement of a system incorporating the method disclosed herein. A plurality of devices and sensors connect to a wireless communications network 150. A device 100, a coffee machine 101, and a gateway 110 include wireless communication modules allowing them to communicate with the wireless communications network 150. The device 100, the coffee machine 101, and the gateway 110 are illustrated including a SIM card (Subscriber Identity Module card). Each SIM card carries a unique serial number, the Integrated Circuit Card Identifier (ICCID) and the International Mobile Subscriber Identity (IMSI). Further, the device 100, the coffee machine 101, and the gateway 110 may each have an equipment identifier such as the International Mobile Equipment Identity (IMEI) which may be used by the wireless communications network 150 to identify them.

The device 100 and the coffee machine 101 contain at least one sensor, information from which is accessible by an external application 180. The gateway 110 communicates with sensors 105 by a local communication network. The sensors 105 may connect to the gateway 110 by wire, or by a local wireless connection such as Bluetooth™ or WiFi™. A storage server 170 is connected to the wireless communications network 150. The storage server 170 is arranged to receive requests from and serve responses to the application 180.

In an alternative embodiment the storage server 170 is a part of the wireless communications network 150. Further, the applications 180 may reside either within or outside of the wireless communications network 150.

In the following explanation reference will be made to device 100. However the following may equally apply to the coffee machine 101 or the combination of the gateway 110 with at least one sensor 105.

In operation, a device 100 sends a store request to the storage server 170 via the wireless communications network 150. The store request may be sent using HTTP POST and a unique ID, for example "deviceID". Such a store request may be arranged as:

http://www.m2mse.com/deviceID/temp/14july2011/highest_temp

The store request comprises a host URL part, which in the above example is "www.m2mse.com". This points to the storage server 170, which in this example has the host name "m2mse". The store request further comprises a path part, which is "/deviceID/temp/14july2011/highest_temp" in the above example. This path part is used to direct where to store the body of the store request, which in this example is stored as "temp.xml".

The first section of the path part of the store request, in this case the device identifier "deviceID", must be provisioned (either manually or automatically) by the device 100 before it sends the store request. The device identifier must be unique such that the storage server 170 can distinguish between different devices.

Therefore, according to the method and apparatus disclosed herein, the storage server 170 makes use of the SIM card that uniquely identifies a wireless communications device such as device 100, gateway 110 or coffee machine 101. The unique identity carried by the SIM card uniquely identifies the SIM card to the wireless communications network 150. This unique identity that is used by the wireless communications network 150 is also used by the storage server 170 to create a storage tree or directory structure for storage of the resource received from the device 100. The storage path (which points to a resource) is thus preserved from the original request. What is added is the identity used by the wireless communications network 150 as the root of each different storage path.

The wireless communications network 150 includes a home location register which maps the IMSI on the SIM card to the MSISDN. The MSISDN corresponding to an IMSI is readily identified by both the wireless communications network 150 and the device 100 during normal operation. In the following example the MSISDN is used as a unique identifier attributable to device 100.

Figure 2:
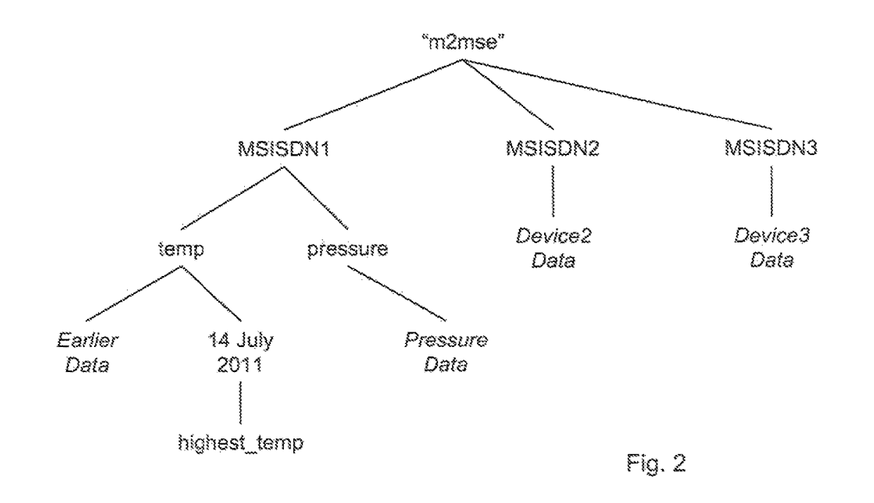
FIG. 2 illustrates a storage tree maintained by a storage server.

For example, anything a device 100 (having a SIM card carrying an IMSI mapping to MSISDN1) stores in the storage server 170 will be stored under root path labeled "MSISDN1". FIG. 2 illustrates a storage tree maintained by a storage server 170. In this case the storage server 170 is the "m2mse" storage server referenced above and it has received a store request as follows:

http://www.m2mse.com/MSISDN1/temp/14july2011/highest_temp

The root of "m2mse" comprises three directories each for a different device 100 that the storage server 170 has received store requests from. In response to the above store request, the storage server has stored the resource "temp.xml" in the directory called "highest_temp", which in turn is stored in a directory for today's temp called "14 Jul. 2011", which in turn is stored in a directory called "temp", which in turn is stored in a directory called "MSISDN1". Data from days preceding the 14 July 2011 is stored in directories alternative to the "14 Jul. 2011". Similarly, pressure data is stored in a directory alternative to the "temp" directory. Resources received from Device2 and Device3 are stored in "MSISDN2" and "MSISDN3" directories respectively, in a similar fashion.

Figure 3:
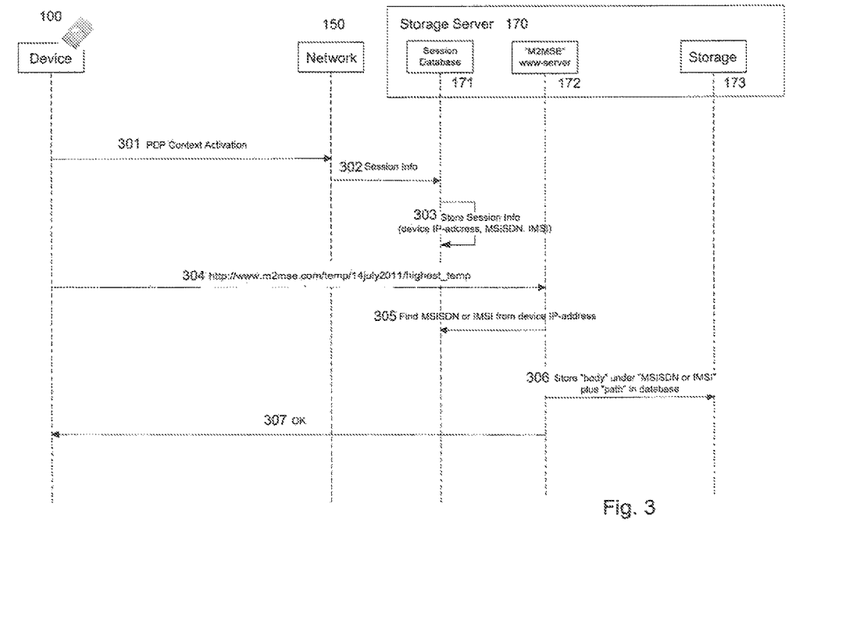
FIG. 3 shows a signaling diagram illustrating the registration of a device 100 with the storage server and the subsequent storing of device generated data in the storage server.

FIG. 3 shows a signaling diagram illustrating the registration of a device 100 with the storage server 170 and the subsequent storing of a resource in the storage server 170. Storage server 170 comprises a session database 171, a web server 172, and a storage 173. At 301 the device 100 sends a PDP context activation to the Gateway GPRS Support Node of a wireless communications network 150. The PDP context is a data structure which contains the identity of the device 100 as used by the wireless communications network 150. At 302, session information from the PDP context is sent from the wireless communications network 150 to a session database 171 in the storage server 170. The session information includes the device IP address, the device MSISDN, and the device IMSI. At 303 the session information is stored in the session database 171.

At 304 a store request is sent from the device 100 to the web server 172 of the storage server 170. The store request takes the form:

http://www.m2mse.com/temp/14july2011/highest_temp where the address of the web server 172 is "www.m2mse.com". This store request does not indicate the device identifier, so at 305, the web server 172 retrieves the MSISDN of the device 100 that sent the store request from the session database 171. The web server 172 uses the IP-address of the device 100, which it received with the store request, to identify the device 100 to the session database 171.

Once the web server 172 has the MS ISDN of the device 100, at 306 it uses this to store the data (here xm I data "temp.xml" describing today's highest temperature) using the same path as received in the store request ("temp/14july2011/"), stored under the MSISDN of the device retrieved from the session database 171. Once the data is stored, at 307 the web server 172 sends an acknowledgement to the device 100.

Figure 4:
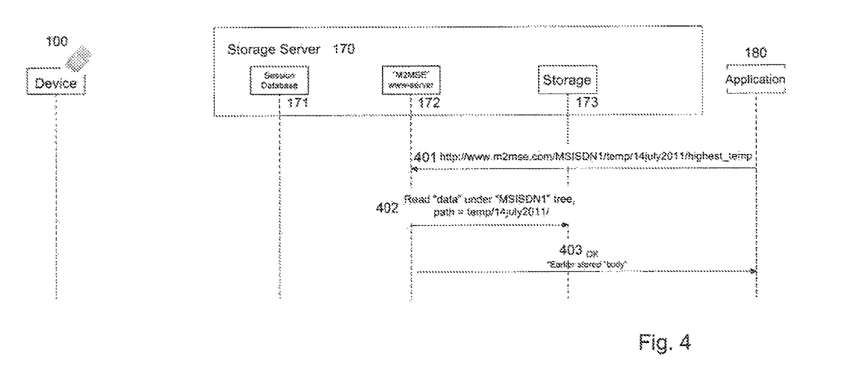
FIG. 4 shows a signaling diagram illustrating the retrieval by an application of data stored in the storage server.

FIG. 4 shows a signaling diagram illustrating the retrieval of data stored in the storage server 170 by an application 180. At 401, an application 180 issues an HTTP GET request to the storage server 170. The HTTP GET message is received by the web server 172, which in this example has the host name "M2MSE". Since the path (pointing to a resource) from the original store request (sent from the device 100 to storage server 170) is preserved in the storage 173, the application 180 can use the same path in its HTTP GET request. In this case, the HTTP GET request comprises:

http://www.m2mse.com/MSISDN1/temp/14july2011/highest_temp

In this get request, the application 180 provides the MS ISDN number for the particular device 100. This allows for expedient processing of the get request at 402, whereby the web server 172 accesses the storage 173 at the tree path indicated by the received identity "MSISDN1" and retrieves the resource indicated by the path indicated in the get request. At 403 the retrieved resource is sent by the web server 172 to the application 180.

The above described method and apparatus allows a device 100 to store data in the storage server 170 re-using a device identifier that is used in the wireless communications network 150. This means that the data is stored without the need for provisioning a new unique key for that purpose. Further, this solution offers a secure way for a device to either write or read its own data. There is minimal risk of a device writing to or an application reading from the wrong data area because the area is identified by the unique ID used by the wireless communications network.

The application 180 may not include the MSISDN of the particular device 100 in its HTTP GET request at 401. In that case, the storage server 170 accesses a database to map the identity given in the HTTP GET request, such as an external ID, to the appropriate MSISDN. The database may be part of the wireless communications network 150, such as a Home Location Register. Such a mapping step would always be required if a new unique identifier was used for the storage of data. Using the same identifier for data storage that is used in the wireless communications network to identify the device still provides the above described advantages in the storage of data even if the application 180 does not use this identifier for data retrieval.

Figure 5:
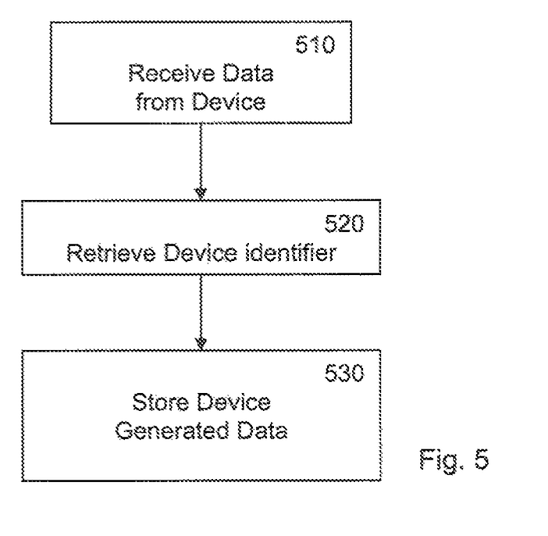
FIG. 5 is a flow diagram illustrating a method of caching device generated data.

FIG. 5 is a flow diagram illustrating the method of caching device generated data. At 510, device generated data is received from a device via a wireless communications network. At 520 a device identifier is retrieved, the device identifier being that used by components within the wireless communications network to identify the device. At 530 the device generated data is stored with the device identifier, that is, the device generated data is stored in association with the device identifier. The device generated data may then be located in and retrieved from storage using the device identifier.

Figure 6:
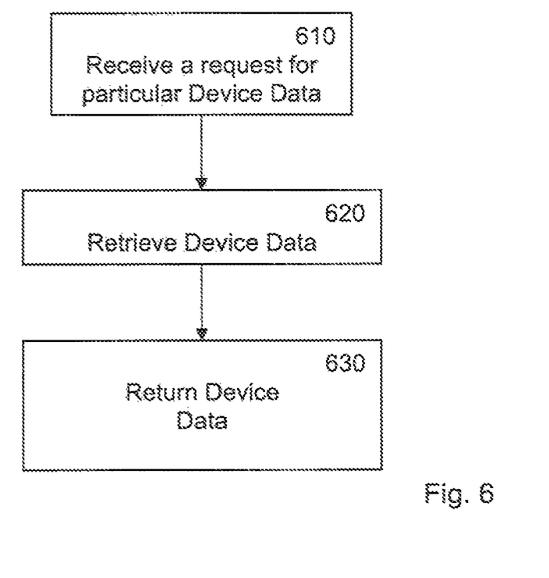
FIG. 6 is a flow diagram illustrating a method of retrieving cached device generated data.

FIG. 6 is a flow diagram illustrating the method of retrieving cached device generated data. At 610 a request for particular device generated data is received. The request includes a device identifier, the device identifier being that used by components within the wireless communications network to identify the device. At 620, the particular device generated data is retrieved from a data store, using the received device identifier. At 630, a reply to the request is sent, the reply comprising the particular device generated data.

Figure 7:
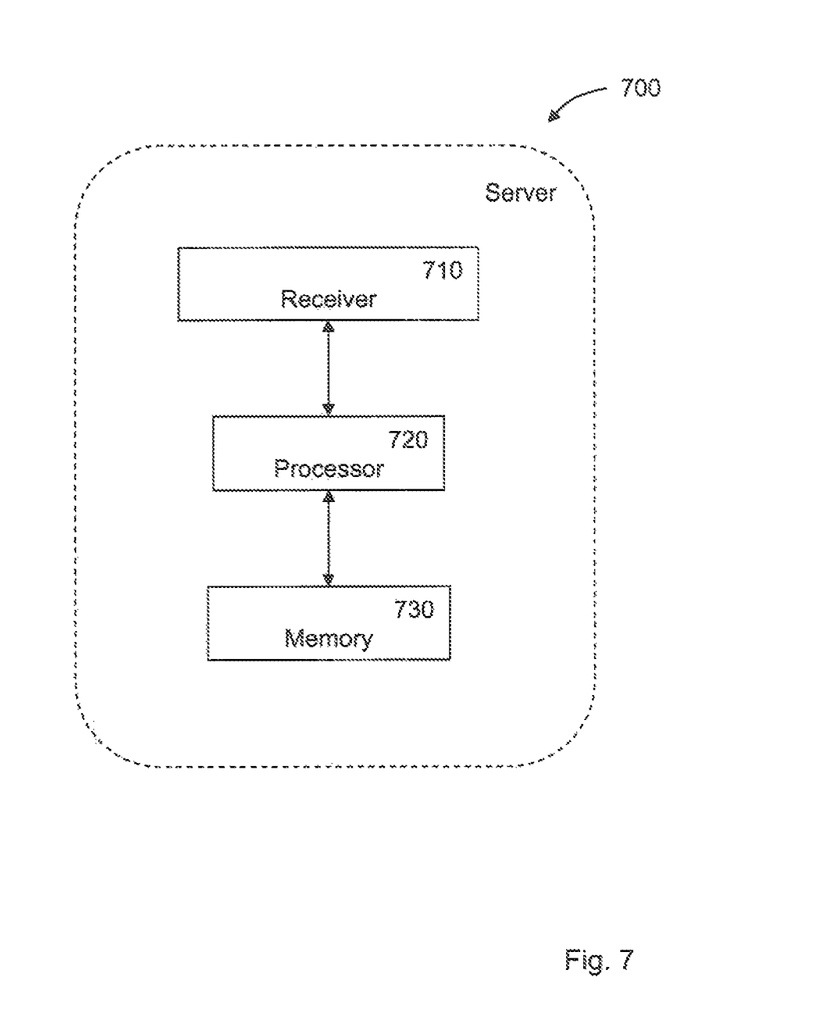
FIG. 7 illustrates the general structure of the server described above.

FIG. 7 illustrates the general structure of the server described above. The server 700 comprises a receiver 710, a processor 720, and a memory 730. The receiver 710 comprises a communications module for receiving and sending messages. The receiver 710 is arranged to communicate via a wireless communications network, and can receive device generated data from a plurality of devices via the wireless communications network. The receiver 710 is further connected to a wired network and can receive a request for device generated data from an application either via the wired network or via the wireless communications network.

The server 700 further comprises a processor 720, which is arranged to perform the method disclosed herein. The processor 720 controls communications sent and received by the communications module 710 and also controls access to the memory 730. The memory 730 may store the device generated data. In an alternative embodiment, the device generated data is stored on a storage device external to the server but connected thereto via a communications network.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

Further, while examples have been given in the context of particular communications standards, these examples are not intended to be the limit of the communications standards to which the disclosed method and apparatus may be applied. For example, while specific examples have been given in the context of LTE, the principles disclosed herein can also be applied to a WCDMA system, other wireless communication system, and indeed any communication system which handles device generated data.

The invention claimed is:

1. A method for caching and retrieving device generated data, the method comprising:
   receiving, at a server, via a wireless communication network, a store request transmitted by a device, the store request comprising data generated by the device and a storage path identifying a name of a folder for storing the received data, wherein the device is a sensor and includes a wireless communication module;
   retrieving, at the server, a device identifier used by components within the wireless communication network to identify the device;
   creating, at the server, a modified storage path having the device identifier as the root of the modified storage path, wherein creating the modified storage path comprises prepending the device identifier to the received storage path such that the modified storage path includes the device identifier followed by the received storage path;
   storing, at the server, the device generated data at the modified storage path with the device identifier as the root of the storage path;
   receiving, at the server, a request from an application for the device generated data using the storage path included in the request, wherein the application is external to the device and the server;
   retrieving, at the server, the device generated data; and
   returning, at the server, the device generated data to the application in reply to the request,
   wherein an active communication link between the wireless communications network and the device is not required at the time of retrieving and returning the device generated data to the application in reply to the request.

2. The method of claim 1, wherein the device generated data is stored in a file system, and wherein the root directory of the file system is named with the device identifier.

3. The method of claim 1, wherein the request identifies the particular device by its device identifier.

4. The method of claim 1, wherein if the request does not include the device identifier, then the method further comprising mapping the device identified in the request to a device identifier.

5. The method of claim 1, wherein the device identifier is at least one of Mobile Station Integrated Services Digital Network Number (MSISDN), International Mobile Subscriber Identity (IMSI), and International Mobile Equipment Identity (IMEI).

6. A server arranged to cache and retrieve device generated data, the server comprising:
   a receiver configured to receive, via a wireless network, a store request transmitted by a device, the store request comprising data generated by the device and a storage path identifying a name of a folder for storing the received data, wherein the device is a sensor and includes a wireless communication module;
   a processor configured to retrieve a device identifier used by components within the wireless network to identify the device;
   the processor configured to create a modified storage path having the device identifier as the root of the modified storage path, wherein creating the modified storage path comprises prepending the device identifier to the received storage path such that the modified storage path includes the device identifier followed by the received storage path;
   a memory configured to store the device generated data at the modified storage path with the device identifier as the root of the storage path;
   the receiver is further configured to receive a request from an application for the device generated data, wherein the application is external to the device and the server;
   the processor is further configured to retrieve the device generated data using the storage path included in the request; and
   the processor is further configured to return the device generated data to the application in reply to the request,
   wherein an active communication link between the wireless communications network and the device is not required at the time of retrieving and returning the device generated data to the application in reply to the request.

7. The server of claim 6, further comprising a session database for receiving session information in respect of the device.

8. The server of claim 6, wherein the session information comprises an IP-address of the device, plus the device identifier.

9. The server of claim 7, wherein the processor retrieves the device identifier from the session database.

10. The server of claim 6, wherein the memory stores the device generated data in a file system, and wherein the root directory of the file system is named with the device identifier.

11. The server of claim 6, wherein the device identifier is at least one of Mobile Station Integrated Services Digital Network Number (MSISDN), International Mobile Subscriber Identity (IMSI), and International Mobile Equipment Identity (IMEI).

12. A non-transitory computer-readable medium, carrying instructions, which, when executed by a server, causes the server to:
   receive, via a wireless communication network, a store request transmitted by a device, the store request comprising data generated by the device and a storage path identifying a name of a folder for storing the received data, wherein the device is a sensor and includes a wireless communication module;
   retrieve a device identifier used by components within the wireless communication network to identify the device;
   create a modified storage path having the device identifier as the root of the modified storage path, wherein creating the modified storage path comprises prepending the device identifier to the received storage path such that the modified storage path includes the device identifier followed by the received storage path;
store the device generated data at the storage path with the device identifier as the root of the storage path;
receive a request from an application for the device generated data, wherein the application is external to the device and the server;
retrieve the device generated data using the storage path included in the request; and
return the device generated data to the application in reply to the request,
wherein an active communication link between the wireless communications network and the device is not required at the time of retrieving and returning the device generated data to the application in reply to the request.

* * * * *